United States Patent
Patelli et al.

[11] Patent Number: 5,803,643
[45] Date of Patent: Sep. 8, 1998

[54] DEVICE ACTUATED AND MAINTAINED BY AXIAL PRESSURE FOR MUTUAL LOCKING OF TUBULAR SECTIONS OF A TELESCOPIC TUBE

[76] Inventors: Quinto Patelli, Via Fratelli Cervi 33, 40054 Budrio, Bologna; Giuseppe Patelli, Via Bentivogli 6, 40138 Bologna, both of Italy

[21] Appl. No.: 741,823
[22] Filed: Oct. 31, 1996
[30] Foreign Application Priority Data Oct. 31, 1995 [IT] Italy ............................... BO950154 U

[51] Int. Cl.⁶ ...................................................... F16B 7/10
[52] U.S. Cl. ........................... 403/109; 403/371; 403/297; 15/144.4
[58] Field of Search .................................. 15/144.3, 144.4; 403/109, 343, 350, 374, 377, 365, 367, 368, 371, 372, 358, 297

[56] References Cited

U.S. PATENT DOCUMENTS

| | | | |
|---|---|---|---|
| 2,991,096 | 7/1961 | Davidson | 403/365 |
| 3,596,946 | 8/1971 | Davis et al. | 403/109 |
| 3,700,271 | 10/1972 | Blaurock et al. | 403/372 |
| 4,152,086 | 5/1979 | Achenbach et al. | 403/372 X |
| 4,238,164 | 12/1980 | Mazzolla | 403/109 |
| 4,884,916 | 12/1989 | Johnson, III | 403/371 X |
| 5,375,938 | 12/1994 | Bartlow | 15/144.4 X |
| 5,460,458 | 10/1995 | Caceres | 403/109 |
| 5,502,864 | 4/1996 | Sorenson | 15/144.4 X |

FOREIGN PATENT DOCUMENTS 1018807  10/1957  Germany .
1085062  9/1967  United Kingdom .

*Primary Examiner*—Brian K. Green
*Assistant Examiner*—William L. Miller
*Attorney, Agent, or Firm*—Cohen, Pontani, Lieberman & Pavane

[57] ABSTRACT

A device for mutual locking concentrically, overlapping telescopic tubes which is actuated and maintained by axial pressure. The mutual locking device may be used to provide telescopic handles for floor brushes, brooms, mops and the like. An internal tubular section with a pin mounted to the end thereof is concentrically inserted within an external tubular section. A wedge-shaped tongue projects axially from the pin. Positioned circumferentially around the pin is an expansion bush provided with a wedge-shaped slot extending at least partially along the length of the bush and ending at a proximal end with asymmetrical entrance shoulders. Upon sliding the internal tubular section into the external tubular section, the tongue causes the bush to expand to lock the two tubular sections together by friction. The protruding entrance shoulder of the bush being offset in an axial direction relative to the other, ensures that torsional movement by the user causes the tongue to intercept the protruding shoulder while axial thrusts by the operator causes the tongue to slide further into the wedge-shaped slot, both of which actions cause the bush to expand further. As a result the bush diametrically expands causing the shell to contact the inner surface of the external tubular section generating friction which, in turn, mutually locks the tubular sections.

15 Claims, 2 Drawing Sheets

DEVICE ACTUATED AND MAINTAINED BY AXIAL PRESSURE FOR MUTUAL LOCKING OF TUBULAR SECTIONS OF A TELESCOPIC TUBE

BACKGROUND OF THE INVENTION

1. Field of the Invention

The present invention is related to a device for mutually locking tubular sections of a telescopic tube at any point along their relative mutual extent, in particular, to telescopic tube handles, such as cleaning brooms or mops.

2. Description of the Related Art

The use of telescopic tubes for various types of handles of commonly used devices is well known, in particular handles utilized for cleaning implements, such as brooms, brushes and mops. The design of such conventional handle arrangements capable of mutual locking of overlapping tubular sections at any point along their relative lengths typically involves the creation of friction by the exertion of pressure of the internal structure against the external structure and an expansion plug means, or of the external structure around the internal structure with a ferrule means. Each of these friction locking means is actuated through mutual rotation of the overlapping tubular sections or of a means associated with them relative to one another.

The disadvantage to such conventional retention devices is that when a relatively high axial pressure combined with torsion is applied by the user to the handle itself, such forces may cause the retention device to deactuate, and as a result, the tubular sections to disconnect. This is particularly true with the use of such handles with mop heads for cleaning floors.

Therefore, it is desirable to design a functional device capable of mutual locking of tubular sections of a telescopic tube at any point along their relative mutual lengths while ensuring that the lock will not disconnect as a result of axial and torsional force components on the handle during normal use.

SUMMARY OF THE INVENTION

The present invention provides a device for the mutual locking of tubular sections of a telescopic tube at any point along their relative mutual lengths while simultaneously ensuring that the tubes will not disconnect by the application of axial and torsional force components on the handle during normal use. In particular, the mutual locking device is especially suitable for cleaning devices, such as brooms, brushes and mops.

The invention also provides a mutual locking device which can be readily, safely and economically mounted automatically by a machine on the tubular sections of a telescopic tube thereby eliminating the need for any manual assistance during manufacture.

The mutual locking device of the present invention is also suitable for use with and able to accommodate a wide variety of applications.

The mutual locking device is relatively simple in construction, inexpensive to manufacture, easy to use and yet reliable in operation, in view of its intended user and use.

The mutual locking device of the present invention includes an internal tubular section with a pin mounted to the end thereof concentrically inserted within an external tubular section. A wedge-shaped tongue projects axially from the pin. Positioned circumferentially around the pin is an expansion bush provided with a wedge-shaped slot extending at least partially along the shell of the bush and ending at one end with asymmetrical entrance shoulders. One of the entrance shoulders forms a protruding shoulder which is offset in an axial direction in relation to the other such that torsional movement by the operator during use causes the tongue to intercept the protruding shoulder while axial thrusts by the operator causes the tongue to penetrate the wedge-shaped slot. As a result, the bush diametrically expands causing the shell to contact the inner surface of the external tubular section generating friction which, in turn, mutually locks the tubular sections.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
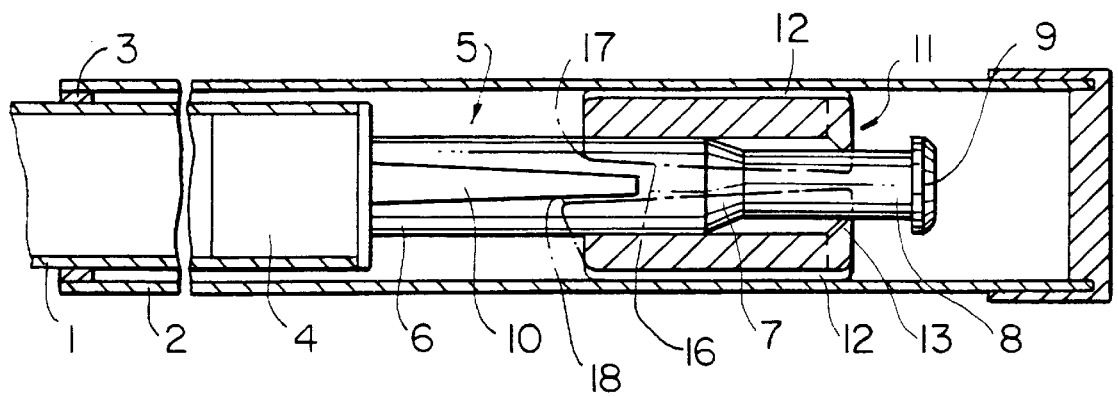
FIG. 1 schematically shows a longitudinal cross-sectional view of a mutual locking device for tubular sections of a telescopic tube which is actuated and maintained by axial pressure in accordance with the present invention.

The mutual locking device for tubular sections of a telescopic tube actuated and maintained by axial pressure is shown in FIG. 1. The telescopic tube comprises two or more overlapping concentric tubular sections. In FIG. 1, the telescopic tube is shown, for illustrative purposes, as two tubular sections, an internal tubular section 1 and an external tubular section 2. Internal tubular section 1 is coaxially inserted inside external tubular section 2. The separation between the internal and external tubular sections 1 and 2 may be shimmed, for example, by a ring 3, thereby restricting any give or movement of the tubular sections relative to one another.

A plug 4 is affixed or mounted, such as by some sort of adhesive, to a front end of internal tubular section 1. In an alternate embodiment, the plug 4 may be integral to the tubular section 1. A pin 5 is integral to plug 4 and preferably made of a polymer material, for example, plastic. Alternatively, pin 5 may be affixed or mounted to plug 4. Pin 5 is divided into three sections: a proximal portion 6, a tapered central conical portion 7 and, a distal portion 8, which is narrower than the proximal portion 6. The proximal end of pin 5 is adjacent plug 4 and the distal end is opposite thereto. At the distal end of pin 5 is formed or attached an end cap 9 which may be, for example, mushroom-shaped. A wedge-shaped tongue 10 projects axially from the outer surface of the proximal portion 6 starting from the proximal end of pin 5 and extending along a portion of the length of the proximal portion 6 of the pin 5. The wedge-shaped tongue 10 is oriented on the proximal portion 6 so that the apex of the wedge-shaped tongue 10 is closest to the distal end of pin 5.

Circumferentially surrounding pin 5 is an expansion bush 11, which is generally cylindrically-shaped with a lumen or hole extending axially therethrough. Preferably, the bush is made of elastically deformable, relatively soft material, such as a plastic. The axial length of bush 11 is substantially equal to the distance between the apex of the wedge-shaped tongue 10 and the distal end of pin 5, not including end cap 9. Bush 11 has a proximal entrance end which is closest to internal tubular section 1 and a distal stopping end, opposite thereto and closest to end cap 9. At the stopping end of bush 11 is a neck 13 having an inner diameter sufficiently small to stop and retain end cap 9.

Figure 2:
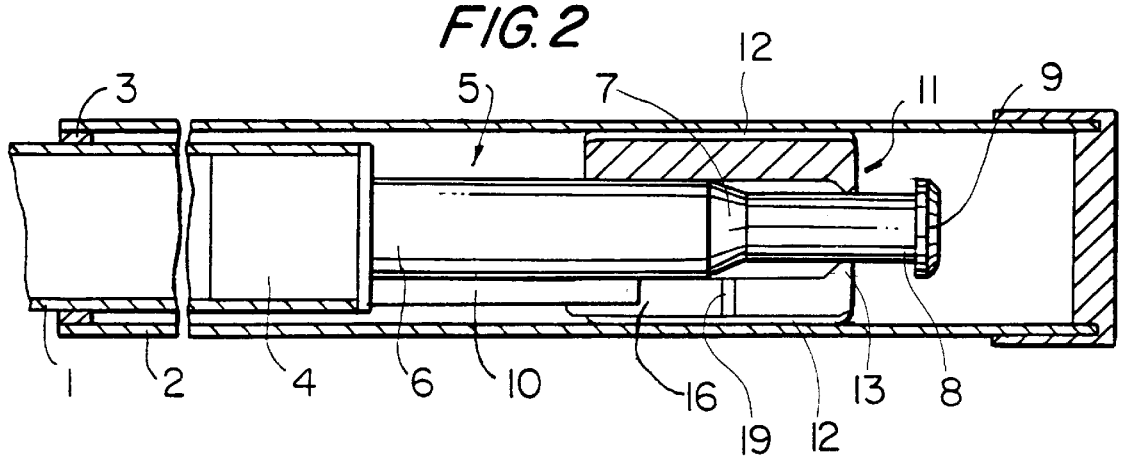
FIG. 2 schematically shows a longitudinal cross-sectional view of a mutual locking device for tubular sections of a telescopic tube in accordance with the present invention with an internal tubular section rotated approximately 90°, in a clockwise direction, from the position shown in FIG. 1.
Figure 3:
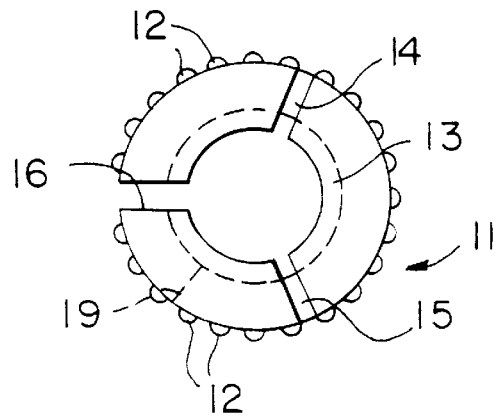
FIG. 3 schematically shows a cross-sectional view of a cylindrical expansion bush in FIG. 1.

As shown in FIG. 3, three substantially equidistant radial slots 14, 15, 16 extend longitudinally along the shell of bush 11. Two of the slots 14, 15 are blind slots which only extend partially across the length of the shell; while the third wedge-shaped slot 16 extends longitudinally across the entire length of the bush 11. Although three slots are represented in FIG. 3, more than three slots are also contemplated and may be positioned as desired. As shown in FIG. 1, wedge-shaped slot 16 is formed by two entrance shoulders 17, 18 formed in bush 11 which extend from the entrance end of bush 11 and converge towards one another at the distal end of the bush 11 proximate the end cap 9. Entrance shoulder 17 is substantially flush with the generally cylindrically-shaped end of the bush 11 whereas entrance shoulder 18 protrudes relative to entrance shoulder 17 towards internal tubular section 1 so as to interact with the apex of the wedge-shaped tongue 10 as described in detail below. As shown in FIG. 2, a transverse notch 19 is formed in the lip of wedge-shaped slot 16 associated with the protruding shoulder 18.

Assembly or mounting of the mutual locking device in accordance with the present invention may be accomplished either manually by an operator or automatically using a machine. Automatic axial insertion of the bush 11 around the pin 5 is made expedient by the design of the locking device having its transverse notch 19 on the wedge-shaped slot 16 of bush 11. During automatic insertion, bush 11 may be oriented in such a manner that when the internal tubular section 1 is inserted into the external tubular section 2 the apex of tongue 10 abuts against the protruding shoulder 18. In this event, because the axial length of bush 11 is substantially equal to the distance between the apex of the wedge-shaped tongue 10 and the distal end of pin 5 the additional axial length of the protruding shoulder 18 will not allow complete insertion of internal tubular section 1 into external tubular section 2. The design of the present invention overcomes this problem by including a transverse notch 19 along the wedge-shaped slot 16 made of a deformable material which permits or allows axial deformation thereof. If during automatic insertion the apex of the tongue 10 abuts protruding shoulder 18, then, as a result of the pressure exerted by an automatic insertion machine, the bush 11 is pushed in a distal direction until neck 13 falls back elastically around the narrower distal portion 8 of pin 5 proximate end cap 9 and accordingly becomes retained by virtue of the latter. Retraction of bush 11, beyond end cap 9, is possible via radial slots 14, 15, 16 positioned circumferentially around bush 11. Although three slots are represented in FIG. 3, more than three slots are also contemplated and may be positioned as desired. The radial slots 14, 15, 16 provide for elastic expansion thereby allowing the neck 13 to pass over end cap 9.

Figure 4:
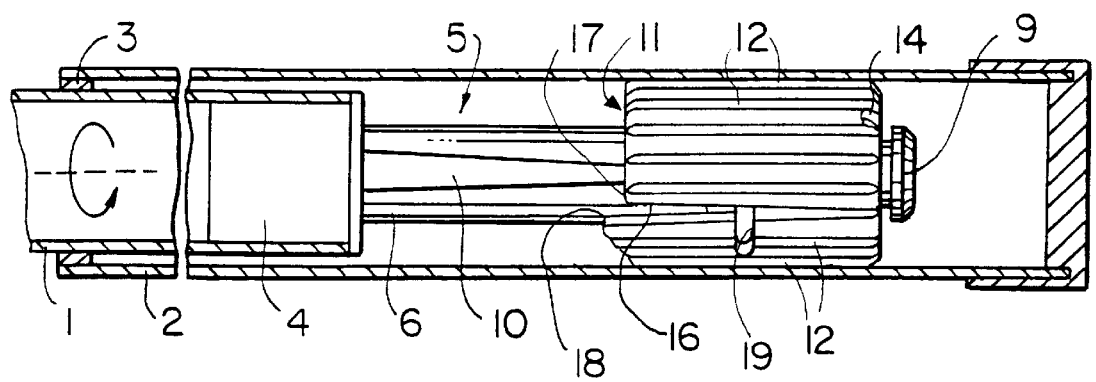
FIGS. 4 through 6 schematically show longitudinal partial cross-sectional views of a mutual locking device for tubular sections of a telescopic tube which is activated and maintained by axial pressure in accordance with present invention as represented by three consecutive operational positions.
Figure 5:
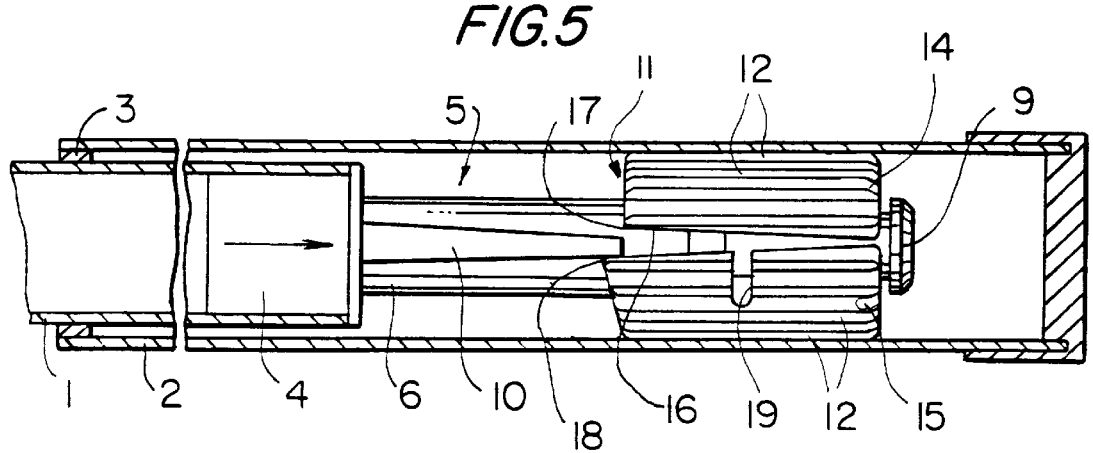
Figure 6:
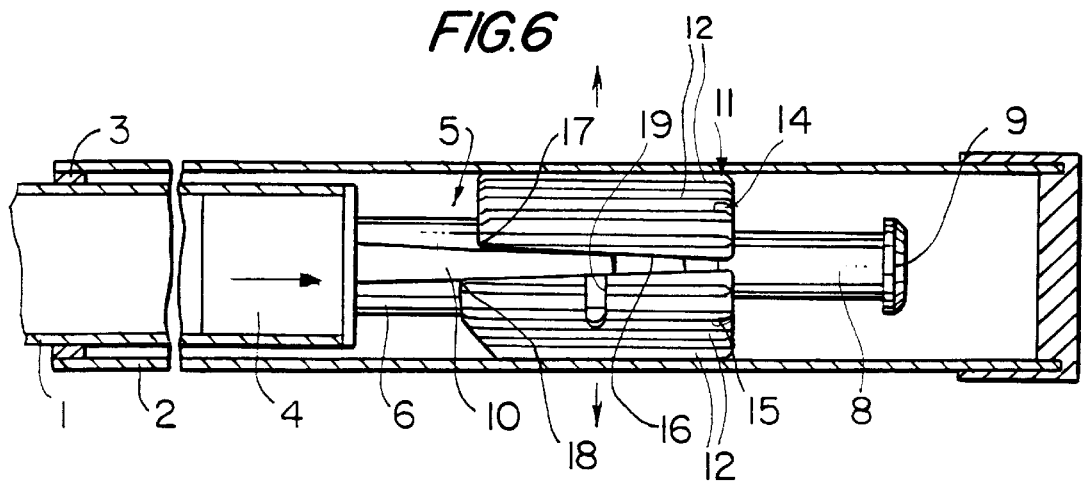

An illustrative example of consecutive operational positions or phases of the mutual locking device of the present invention are illustrated in FIGS. 4 through 6. In FIG. 4, internal tubular section 1 has been coaxially mounted inside external tubular section 2 until the apex of wedge-shaped tongue 10 contacts the end of bush 11. Torsional forces exerted by the user cause internal tubular section 1 to rotate in a clockwise direction in relation to the external tubular section 2. During rotation, the apex of wedge-shaped tongue 10 formed in pin 5 maintains contact along the entrance end of bush 11 until the apex intercepts the protruding shoulder 18 of wedge-shaped slot 16, as shown in FIG. 5. In accordance with this embodiment, as a result of the axial thrusts effected by the user on the internal tubular section 1 in relation to the external tubular section 2, the wedge-shaped tongue 10 penetrates wedge-shaped slot 16 resulting in a diametrical expansion of bush 11, as shown in FIG. 6. This increase in the diameter of bush 11 causes its shell to contact an inner surface of external tubular section 2 which, in turn, generates frictional forces therebetween. As a result of the frictional forces created, the internal and external tubular sections 1, 2 are locked together. Additional friction may be created, for example, by the use of parallel friction beads 12 (as shown in FIG. 3) or grooves extending axially along bush 11 or any other frictional means. These parallel friction beads 12 or grooves may be integral to the shell of bush 11 or mounted or affixed using any known means.

It is evident that in accordance with the design of the present invention torsional movements effected by a user during use of the telescopic tubular handle will not disconnect the fastening or retaining of the tubular sections, while axial thrusts by the user during use ensure fastening. Moreover, the tubular sections of the telescopic tube may be readily released at any time, when necessary or desired, simply by applying traction to each of the tubular sections and exerting an axial thrust or force in opposite directions in relation to each other.

Although the present invention has been shown and described as including two tubular sections, the telescopic tube may comprise more than two overlapping tubular sections. In an alternative embodiment in accordance with the present invention, slot 16 may be designed as extending partially along bush 11 from entrance shoulders 17, 18 and terminating short of the opposite end of bush 11. Furthermore, as for radial blind slots 14, 15, the use of zero, one or more than two radial blind slots is also contemplated by the invention.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A device for locking along mutual lengths of at least two tubular sections of a telescopic tube comprising:

an external tubular section having an open end;

an internal tubular section having a front end size so as to be insertable coaxially with in the open end of said external tubular section;

a retention pin having a circumference, a proximal end mounted to the front end of said internal tubular section and an end cap connected to a distal end of said pin, said pin having a wedge-shaped tongue axially projecting from the circumference of said pin and oriented such that an apex of said tongue is further away from the front end of said internal tubular section than an opposite wider end of the tongue; and a tubular expansion bush having a longitudinal central lumen and a longitudinal wedge-shaped expandable slot sized so that the tongue is insertable therein, the bush being slidably mounted onto said pin so that said pin slides within the lumen and so that the tongue of said pin cooperates with the slot of said bush and so that upon sliding of said internal tubular section into the open end of said external tubular section the tongue of said retention pin slides into the slot of said bush to expand the bush so that said bush contacts an inner surface of said external tubular section to lock said internal and external tubular sections together by friction, and wherein said bush has an entrance end through which said pin is inserted, the entrance end of said bush having two asymmetrical entrance shoulders which form the wedge-shaped slot, one of said entrance shoulders protruding in an axial direction toward said internal tubular section relative to the other entrance shoulder.

2. The device of claim 1, wherein said pin comprises a proximal portion adjacent the front end of said internal tubular section, a distal portion narrower in diameter than said proximal portion and a tapered central conical portion interposed therebetween.

3. The device of claim 2, wherein said end cap has a diameter greater than that of the distal portion of said pin.

4. The device of claim 3, wherein the wedge-shaped tongue axially projects from and alone the proximal portion of said pin.

5. The device of claim 2, wherein said bush has a length approximately equal to a distance between the apex of the tongue and the distal end of said pin.

6. The device of claim 5, wherein a distal end of said bush has a neck which reduces a diameter of the central lumen.

7. The device of claim 6, wherein said neck is provided with a radial slot to enable elastic deformation of said neck to allow said bush to slide over the end cap of said pin.

8. The device of claim 1, wherein said slot longitudinally extends along a portion of said bush.

9. The device of claim 1, wherein said slot longitudinally extends along an entire length of said bush.

10. The device of claim 1, further comprising a plurality of parallel beads extending from an outer circumferential surface of said bush.

11. The device of claim 1, wherein a first proximal portion of said bush protrudes in a proximal direction to a greater extent than a second proximal portion of said bush which is substantially flush with a proximal end of said bush.

12. The device of claim 1, wherein said bush is comprised of elastic material.

13. The device of claim 1, wherein an axial cut is formed in said bush extending from said slot.

14. The device of claim 1, wherein a distal end of said bush has a neck which reduces a diameter of the central lumen.

15. The device of claim 1, wherein said bush has a circumference and the slot is defined in the circumference of said bush.

* * * * *